UNITED STATES PATENT OFFICE.

TAYLOR J. SMITH, OF UNION CITY, GEORGIA.

COMBINED BALING AND COMPRESSING APPARATUS.

1,022,709.

Specification of Letters Patent. Patented Apr. 9, 1912.

Application filed June 15, 1911. Serial No. 633,255.

*To all whom it may concern:*

Be it known that I, TAYLOR J. SMITH, a citizen of the United States, residing at Union City, in the county of Campbell and State of Georgia, have invented certain new and useful Improvements in Combined Baling and Compressing Apparatus, of which the following is a specification.

My invention relates to improvements in a combined baling and compressing apparatus, an object being to provide an improved construction of press box having an improved mechanism for operating the platen, in connection with a removable block normally positioned between the platen and the plunger in the formation of the bale, and removed from such position when the bale is compressed.

A further object is to provide an improved car adapted to support the burlap for covering the bale, said car adapted to be moved across the upper end of the press box in placing the burlap in position, and said car also operating as the compress head during the bale compressing operation.

A further object is to provide improved means for feeding the lint cotton as it comes from the gin into the press box in the form of a continuous wad or sheet, which is positioned in layers by means of relatively heavy rollers supported upon a reciprocating carriage, and movable back and forth over the press box.

A further object is to provide in connection with this improved carriage, an improved box-like chute having cotton feeding conveyers therein, said chute being pivotally supported in position to receive the cotton from the gin, and direct it between the rolls of the said carriage.

A further object is to provide an improved construction of press box having doors at sides and ends, with improved means for holding the doors in operative or closed position, and enabling the side doors to be lowered independently of the end doors.

A further object is to provide improved mechanism for transmitting motion from an engine to the platen operating plunger of the press box, which permits the platen to lower as the bale is formed in the press box, and which is operated to elevate the platen to compress the bale.

A further object is to provide an improved construction of carriage having rollers for evenly distributing and folding the sheet or bat of cotton into the box, and provide improved means for compelling the rolls which feed the cotton to always turn in the same direction, regardless of the reciprocating motion of the carriage.

A further object is to provide an apparatus of this character supporting in its framework, two complete bale forming and compressing mechanisms, both of which communicate with a single conveyer conduit adapted to be connected with a gin or battery of gins, and provide improved means whereby the cotton from the gin is directed into only one of said mechanisms at a time, whereby in one mechanism the baling operation is being performed, and in the other the compressing, so that an operator or operators may take care of all of the cotton from the gins without stopping the operation at any time.

A further object is to provide improved driving means for transmitting power to the several operating means of the two independent mechanisms above mentioned, and provide an improved arrangement of clutch and lever for controlling the transmission from the driving means to both mechanism operating means.

A further object is to provide an improved apparatus of this character which takes care of the lint cotton from the gin, feeds it in layers backwardly and forwardly in the press box, pressing downwardly the platen as these layers accumulate, and pressing them upon a sheet of burlap or other covering previously positioned in the box, said downward movement being resisted by upward pressure on the platen, so that cotton is formed in a relatively tight bale; then removing a block which is interposed between the platen and the plunger; then positioning a second strip of covering material across the top of said box, and moving a car over the top of said box forming a pressure head on the box; then operating the plunger to move upwardly and compress the bale between the platen and the said head, then opening the sides of the box; then tying the compressed bale, and next ejecting said bale.

With these and other objects in view, the invention consists in certain novel features of construction and combinations and arrangements of parts, as will be more fully hereinafter described and pointed out in the claims.

In the accompanying drawings.

Figures 1, 2:
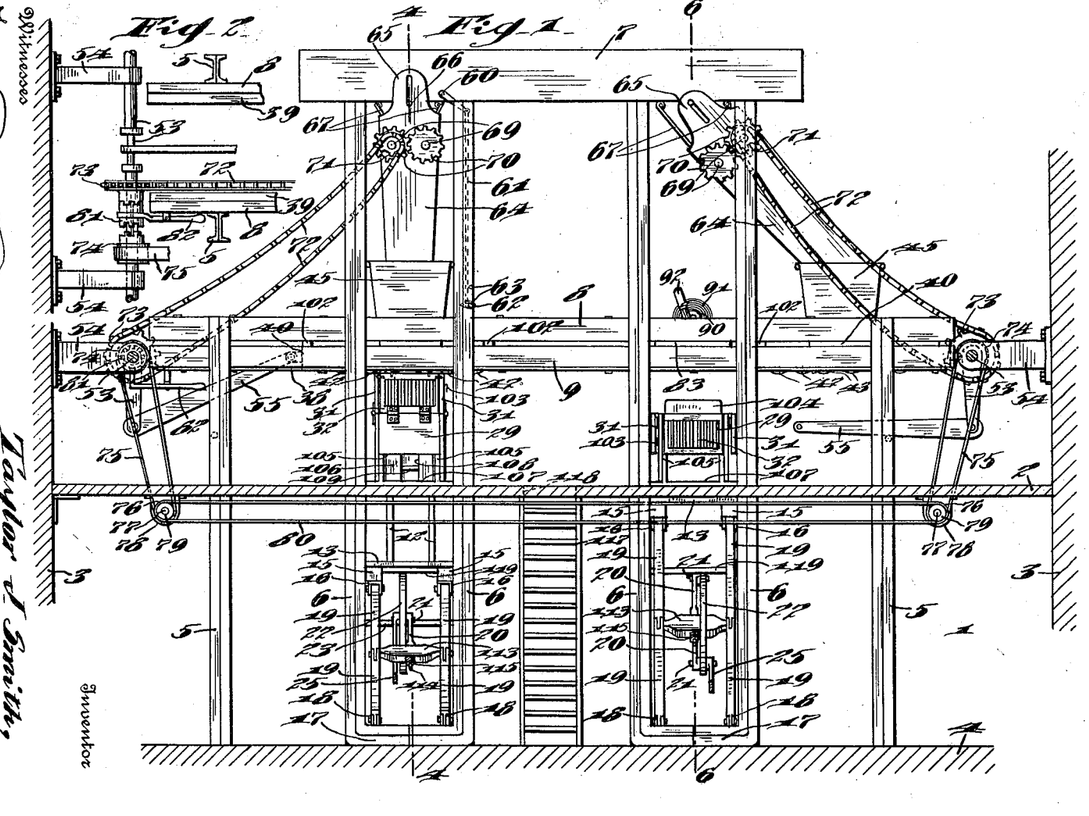
Figure 1, is a view in side elevation partly in section illustrating my improved apparatus.
Fig. 2, is a fragmentary sectional plan view of the left hand end of the apparatus shown in Fig. 1 to illustrate the power transmitting means.

My improved apparatus is adapted to occupy two or more floors of a building, and by reference particularly to Fig. 1, it will be seen that the apparatus is arranged to project from the cellar or basement 1, up through the floor 2, while 3, 3, represent the walls of the building, and 4 the cement or other floor of the cellar, which acts as a foundation for the framework of the apparatus. This framework is composed of angle irons in so far as such is applicable, and consists of a plurality of vertical columns 5 and 6. The columns 5 are at the ends of the apparatus, and are appreciably shorter than are the columns 6. The columns 6, eight in number, constitute the upright structural support for my improved independent mechanisms, and also support at their upper ends, a conduit 7 adapted to be connected to a gin or battery of gins (not shown). To the vertical columns 5 and 6, parallel horizontal channel bars 8 and 9 are secured, it being understood that a pair of these channels are located at both sides of the apparatus, and serve as supporting means for my improved car and carriages, as will be hereinafter pointed out.

It is to be understood that I employ two bale forming and compressing mechanisms, which are precisely alike, one of such mechanisms being operated in advance of the other, but they are structurally alike, and the description of one applies alike to both.

Figures 4, 5:
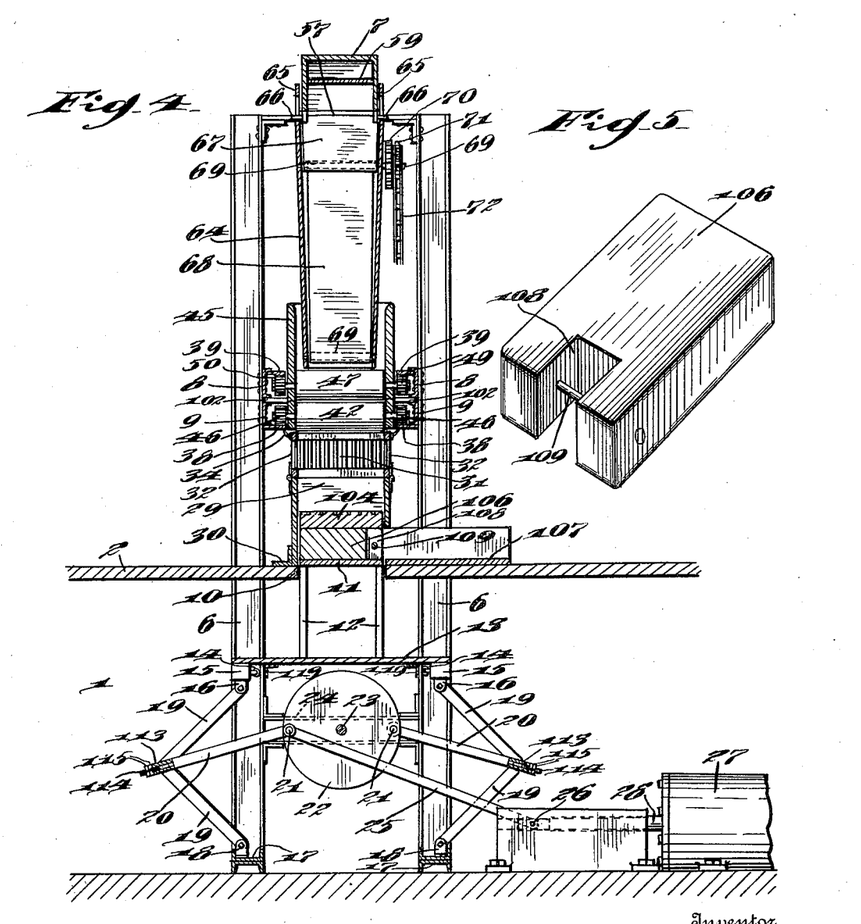
Fig. 4, is a view in section on the line 4—4 of Fig. 1.
Fig. 5, is a detail perspective view on an enlarged scale of the block 106.
Figures 6, 7:
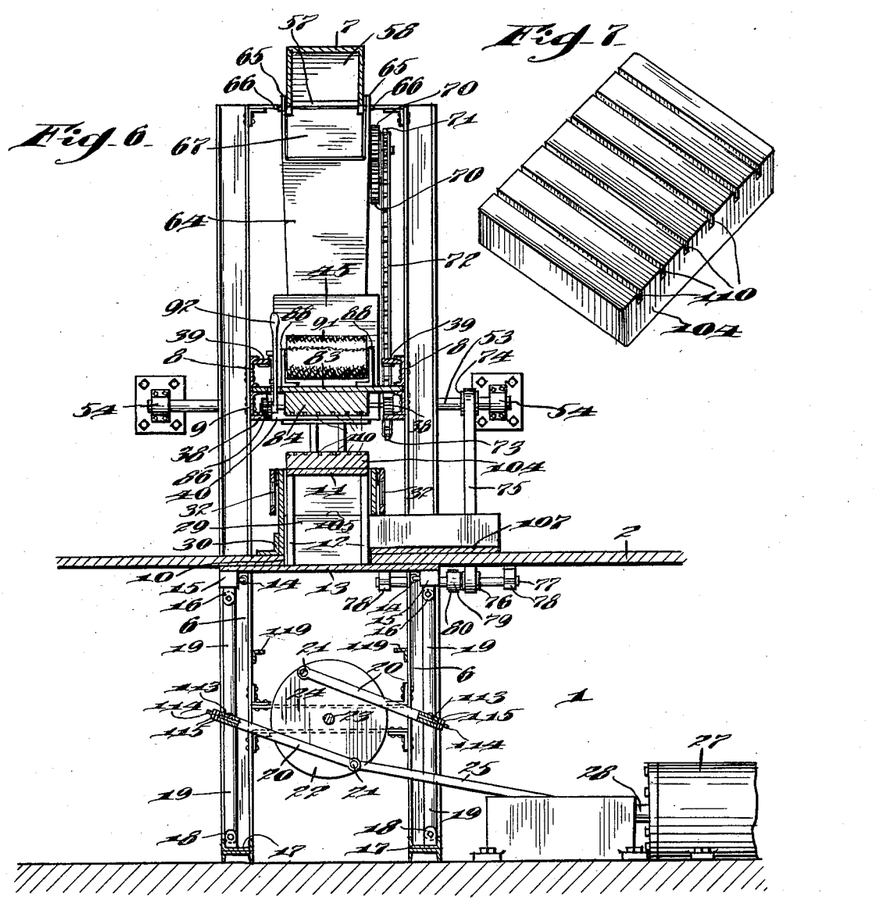
Fig. 6, is a view in section on the line 6—6 of Fig. 1.
Fig. 7, is a detail perspective view of the platen 104.

The floor 2, at points between the sets of uprights 6, is provided with rectangular openings 10 through which the plungers 11 project. These plungers consist of an upper horizontal head 11 connected by four posts 12 with a vertically movable platform 13. This platform 13 is cut out at its corners to receive the uprights 6, and is provided with small rollers 14 to run in the channels of the posts, and facilitate the easy movement of the plunger. It is to be understood that while these several posts may be made in various ways, they are preferably composed of channel irons secured back to back, and this structure facilitates the employment of the rollers 14, as the latter may run against the inner face of one of the flanges of each post. These rollers are supported in brackets on cross bars 15, the latter being fixed to the under face of platform 13, and having the bifurcated brackets 16 secured to their under face as illustrated in Fig. 4.

The lower ends of the posts 6 are turned inwardly as shown at 17, and these inwardly turned ends have brackets 18 fixed thereto. The brackets 16 and 18 are connected by toggle links 19 at both sides of the structure as seen in Fig. 4, and these toggle links 19 are connected by links 20 with crank pins 21 on a rotary disk 22. This disk 22 is mounted to turn on a shaft 23 supported in transverse bars 24 fixed to uprights 6. One of these crank pins 21 is connected by a link 25 with the cross head 26 of an engine. The engine cylinder indicated by the reference character 27 represents a steam engine cylinder, the piston rod 28 of which is connected to the cross head 26, and in controlling the operation of the plunger, suitable valve mechanism (not shown) must be employed to regulate the flow of steam to the cylinder in accordance with the work to be done as will be more fully hereinafter explained.

The plunger 11, as above stated, moves vertically through the opening 10 in floor 2, and moves vertically in my improved press box 29. This press box is secured to floor 2 by means of angle irons 30, and comprises four walls forming a box of an internal dimension corresponding to the size of the bale to be made. The upper portions of these walls constitute hinged gates 31, and ends 32. In other words, the upper portions of the walls are connected to the main portions of the walls by hinges 33, and for clearness of description, I shall hereinafter refer to these upper portions as gates which are to be let down to permit the ejection of the compressed bale. Normally however, these gates are in a vertical position, the end gates being held in a vertical position by means of hooks 34 dependent from bars 9, and engaging eyes 35 on the end gates. The side gates are held in vertical position by means of hooks 36 connected to the end gates, and positioned in eyes 37 on the side gates. This arrangement permits the side gates to be lowered while the end gates remain vertical, and to lighten the structure, these gates are preferably made of slats as shown.

To the lower flanges of channel bars 9, rack bars 38 are secured, and to the upper flanges of channel bars 8, rack bars 39 are secured, and it will be noted that the teeth of rack bars 38 project upwardly, while the teeth of rack bars 39 project downwardly. The rack bars 38 serve as tracks or rails upon which my improved carriages 40 are supported, it being understood that a carriage is provided for each press box. Each carriage comprises a frame 41, which supports a horizontal series of relatively heavy rollers 42. All of these rolls are provided with trunnions 43, which project through the frame 41, and on the trunnions of all of these rollers, save the two intermediate ones, gears 44 are fixed, and mesh with the racks 38. The intermediate rolls which are located directly below a hopper 45 secured on the carriage, are also provided with gears 46, which mesh with the teeth of racks 38, but one of said gears on each roll is idle, and turns loosely on the trunnion while the other is connected to the shaft by ratchet wheel 47ª and pawls 48ª.

In box 45, above the intermediate rolls 42, two rolls 47 are mounted, and these rolls have trunnions 48 which project through the box, and one trunnion on each roll is provided with a loosely turning gear 49 to mesh with the upper rack 39, while the gear 50 on the opposite end is connected by a ratchet 51 and pawl 52, with its trunnions. The purpose of this particular arrangement of ratchet connected gears and loose gears on the rolls 48 and the intermediate rolls 42, is rendered apparent when it is considered that these rolls serve to force the sheet cotton downwardly into the box, and they must always turn in a direction to feed the cotton. Hence, to permit this, each of these four rolls is provided on one end with a loose gear and on the other end with a ratchet connected gear, so that as the carriage is reciprocated, the several rollers which feed the cotton, will always turn in the proper direction to bring about such feed, and the other rollers 42 will assist the intermediate rollers 42 in pressing the cotton downwardly into the box against the pressure of the plunger. Any upward movement of this carriage is absolutely prevented by means of cross bars 102, which move between the bars 8 and 9. Crank shafts 53 are located at the ends of the apparatus, and I have illustrated these shafts as being supported in brackets 54 connected to the walls of the building. These crank shafts are connected by links 55 with the carriages 41, so that they serve to reciprocate the carriages while they are feeding the cotton into the boxes. The connection between these links and the carriages is such as to permit the disconnection of the link when it is desired to compress the bale, and to illustrate this, attention is called to the right hand side of Fig. 1, which shows one of these links disconnected.

7, represents a conduit which is adapted to be connected to a gin or battery of gins, and through which the cotton is forced by pneumatic pressure. This conduit is provided above each of the boxes 29 with an opening 57, and an inclined partition 58 is fixed in the chute, and connects with the wall of the opening 57 above the right hand box. A hinged door 59 is adapted to close the opening 57 above the left hand box shown in Fig. 3, and when open, acts as an inclined partition to direct the cotton through said left hand opening, and when closed permits the cotton to pass to the right hand opening. To operate this door 59, the hinge pin 60 thereof constitutes a crank shaft which is connected to a rod 61 adapted to be manually operated to move the door, and this rod is made with a hooked end 62 to engage over either of two pins 63 on one of the posts 6 to hold the door in either its open or closed position.

To direct the cotton from conduit 7 into the box below, I employ pivoted chutes 64 which are made at their upper ends with slotted side extensions 65, through which rods 66 connected to the conduit 7 project. This enables each chute, the lower end of which projects into its hopper 45 below, to swing, and hinged guides 67 are connected to conduit 7, and project into the upper ends of these chutes 64, so as to guide the cotton regardless of the angle of the chute. In both chutes, endless apron conveyers 68 are supported on shafts 69, and the upper shafts 69 are connected by intermeshing gears 70, so that the apron conveyers 68 are compelled to move in a direction to positively feed the cotton downwardly. To drive these apron conveyers 68, sprocket wheels 71 are fixed to one of the shafts 69 of the respective chutes, and these sprocket wheels 71 are connected by loose sprocket chains 72 with sprocket wheels 73 on the shafts 53 above referred to. To compel these shafts 53 to turn together, they are both provided with pulleys 74, and these pulleys 74 are connected by belts 75 with pulleys 76 on countershafts 77. The countershafts 77 are supported in suitable brackets 78 secured to the bottom of floor 2, and are provided with pulleys 79 which are connected by a belt 80, so that when one of the shafts 53 turns, the other must turn in unison, providing the pulley 74 is locked to its shaft 53. The shaft 53 at the left hand end of Fig. 1, constitutes the drive shaft of the apparatus, and pulley 74 and sprocket wheel 73 are both mounted loosely on the shaft, and a clutch 81 keyed to the shaft is adapted to lock either said pulley or said sprocket wheel to the shaft or to be moved to a position between them to prevent any power transmission of the apparatus. This clutch 81 is operated by a lever 82 which is manually moved to throw the different mechanisms into and out of operation.

Figure 10:
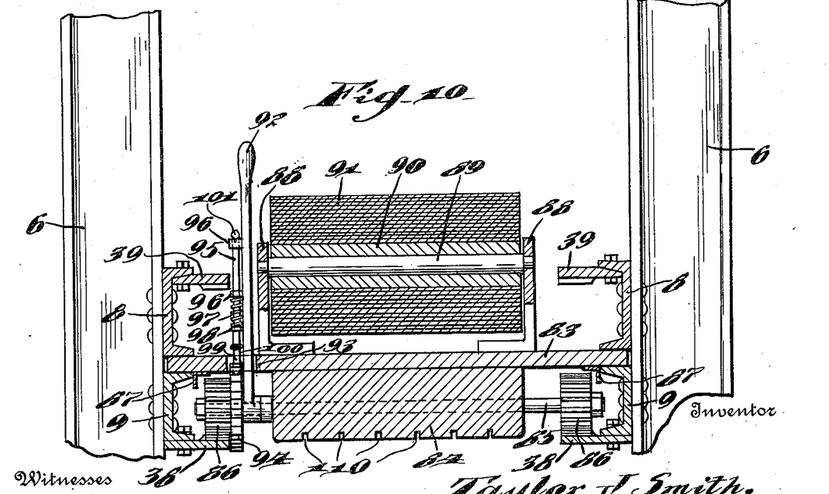
Fig. 10, is a fragmentary view in section on the line 10—10 of Fig. 8.

83 represents a car, the bottom 84 of which constitutes a pressure head for both of the boxes, as will be hereinafter explained. This car is supported upon two axles 85 having gears 86 thereon to run upon the lower racks 38, and the platform of this car projects between the bars 8 and 9, so as to withstand the upward pressure on the car which takes place when the car bottom is operating as a pressure head. Small angle irons 87 are secured to the platform, and are adapted to run against the upper flanges of the lower channel bars 9, so as to hold the car against any lateral movement. On this car, brackets 88 are secured and support a shaft 89 having a roller or spool 90 thereon as shown particularly in Fig. 10. On this roller or spool 90, a roll of burlap or other fabric 91 is located, and is adapted to be fed off the roll to form a covering for the bales as will be hereinafter described.

Figure 8:
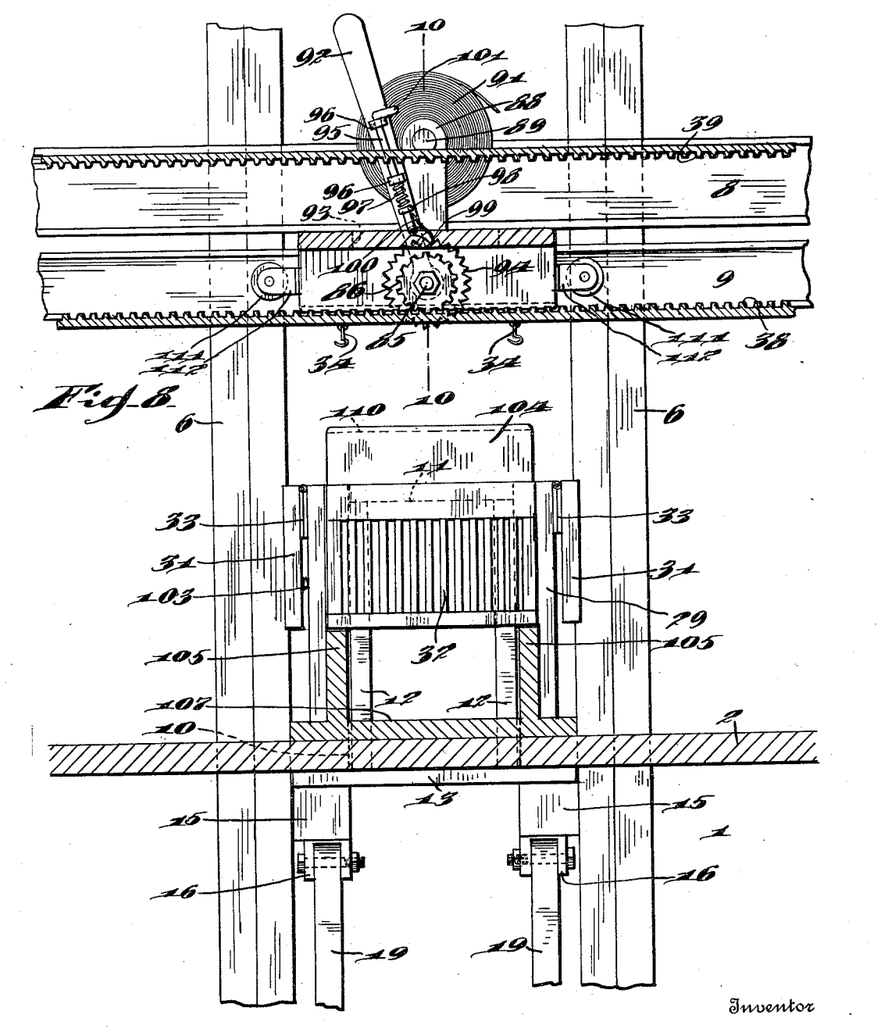
Fig. 8, is an enlarged fragmentary view in longitudinal section illustrating the press box and car structure.
Figure 9:
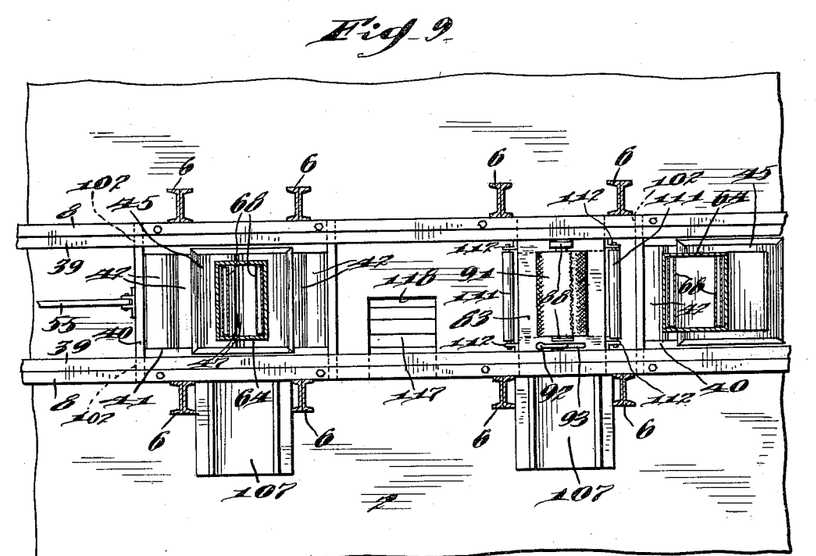
Fig. 9, is a view in horizontal section on the line 9—9 of Fig. 3.

To move the car on its supporting racks 38, a hand lever 92 is fulcrumed on the axle 85, and oscillates through a slot 93 in the platform of the car. A star wheel 94 is fixed to the axle 85, and a vertically movable rod 95 is supported in bearings 96 on the lever 92. This rod 95 is normally pressed downward by means of a spring 97 which bears at one end against one of the bearings 96, and at its other end against a shoulder 98 on the rod. On the lower end of this rod, a pivoted pawl 99 is located, and a flat spring 100 presses this pawl into engagement with the star wheel 94. The upper end of rod 96 is bent forming a handle 101, which is adapted to be operated so as to position the pawl to engage the star wheel, and drive the car in either direction. In other words, to reverse the position of the parts, it is simply necessary to grasp the handle 101, draw the handle 95 upwardly against the action of spring 97, and then turn the rod so that the pawl is positioned oppositely to the position shown in Fig. 8. Hence when the lever is oscillated, the car will be driven in the opposite direction.

To temporarily receive the burlap 91, hooks 103 are provided on the inner side gates 31, and this operation of laying the burlap will be later described.

In each box 29, a platen 104 is located and the downward movement of this platen is limited by bars 105 secured in the box at opposite sides.

106, represents a block, and this block is approximately the size of the compressed bale to be made. Between the plunger and the platen in each box, one of these blocks 106 is normally positioned, and it is to be understood that the bars 105 are of sufficient depth to relieve the blocks 106 from any pressure of the cotton above when the platens 101 reach their lowest position, and are supported on bars 105. When in this lowest position, blocks 106 are to be drawn outwardly into guides 107 provided for the purpose, and to facilitate this withdrawal, each block is provided in one end with a recess 108 across which a rod 109 projects, and is adapted to be grasped by the hand, or by any suitable hook (not shown) to draw the block from under the platen. The block 106 therefore serves as a spacing device between the plunger and the platen 104, so as to enable the plunger in its normal movement to bring the platen to the upper surface of the box, and allow the cotton to be uniformly pressed thereon as the platen moves downwardly. When the block is removed and the plunger again makes its normal movement, it will compress the bale into the size of the block which is the prescribed size of a bale. Platen 104 and the bottom 84 of car 83, are made with grooves 110 for the accommodation of a wire or other binder (not shown) to tie the bale together. To facilitate the feeding of the burlap from the car into position in or over the boxes, rollers 111 are supported in suitable brackets 112 on the ends of the car, and these rollers serve to prevent wrinkling the burlap, and insure a smooth feed.

In order to obtain a nice adjustment of the movement imparted to the platen during its operation, the connection between links 20 and the toggle links 16 is made adjustable, a simple structure being illustrated in which the cross rod 113 connecting the toggle links at opposite sides is made with an opening through which the reduced end 114 of links 20 project, and this reduced end 114 is screw-threaded for the reception of nuts 115, which are screwed thereon, and lock the parts at various adjustments.

Figure 3:
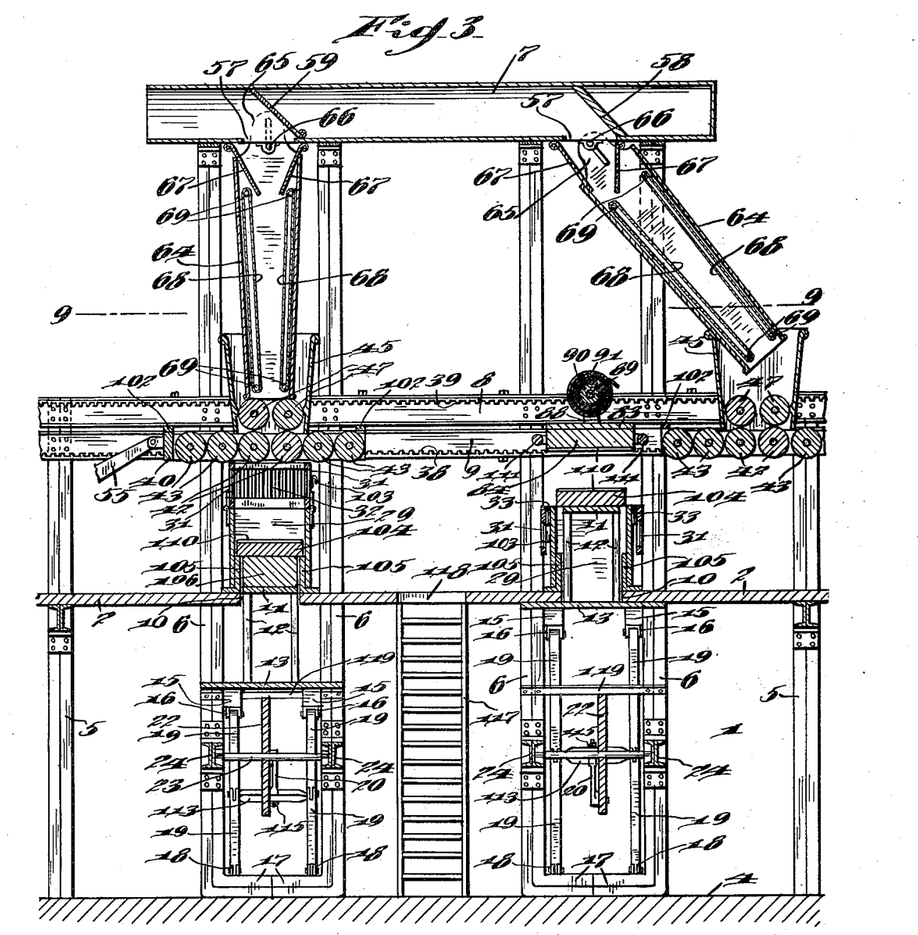
Fig. 3, is a view in vertical longitudinal section showing the parts in the position illustrated in Fig. 1.
Figure 11:
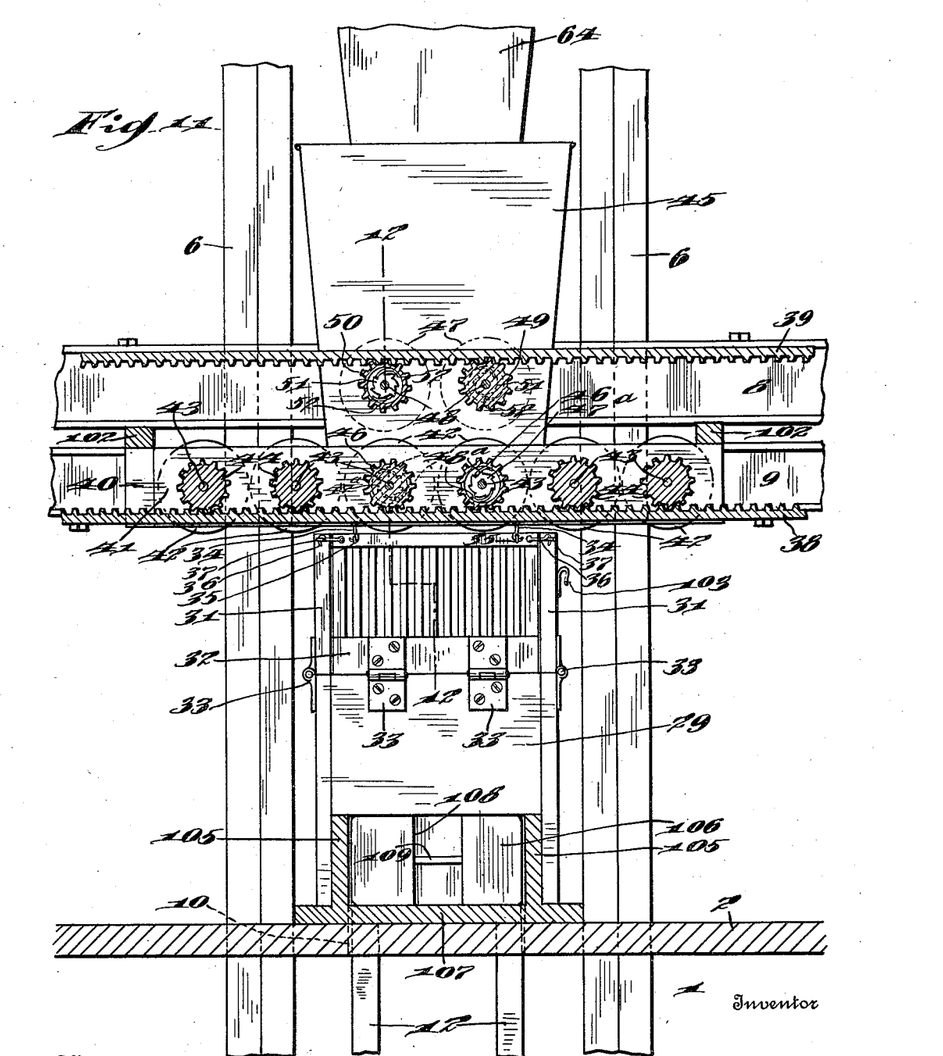
Fig. 11, is a view similar to Fig. 8, but showing the press box in closed position and the cotton feeding carriage located over the box.
Figure 12:
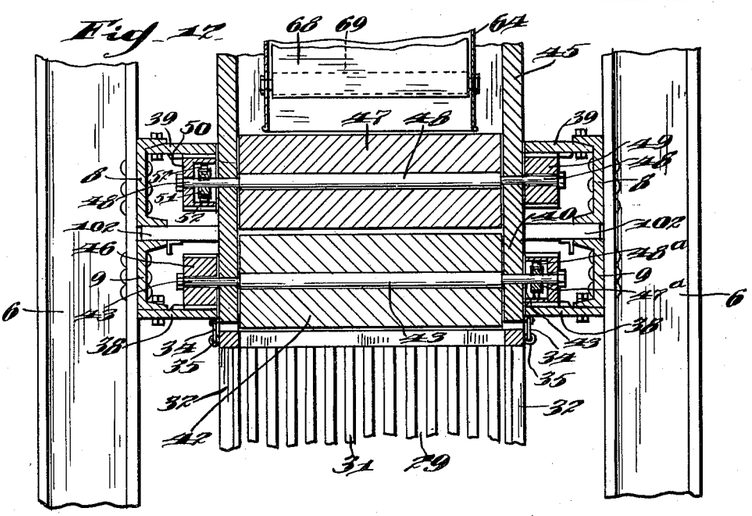
Fig. 12, is a view in section on the line 12—12 of Fig. 11.
Figure 13:
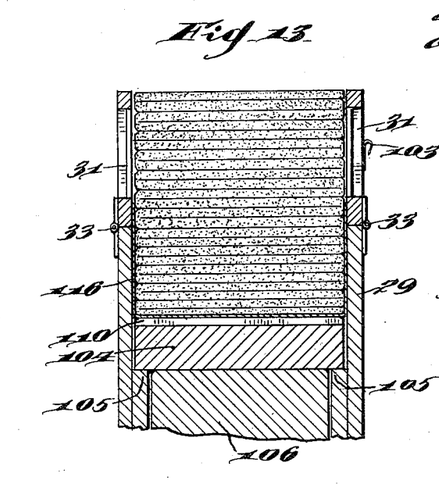
Fig. 13, is a view in vertical section illustrating the bale as it is formed in the box.

The operation is as follows: It is to be understood as above stated, that two mechanisms are employed for baling and compressing, but they operate one ahead of the other. To distinguish these different mechanisms, I shall refer to one as the right hand mechanism, and one as the left hand mechanism, particular reference being had to Figs. 1 and 3. In the position shown in Figs. 1, and 3, the right hand mechanism has completed its compressing operation, while the left hand mechanism is just completing the baling operation, or in other words, has just forced the platen 104 to its lowest position. As the right hand apparatus has completed its full operation, I will describe the same as it begins a new operation. Door 59 is closed, and the cotton passes through conduit 7 into chute 64, car 83 having been previously moved to an intermediate position between the two mechanisms so as to allow the carriage 41 to move backward in operative position over the right hand box, and bring with it the right hand chute 64, so that the cotton is directed by said chute 64, and its apron conveyer 68, into hopper 45. It will be noted that in this right hand mechanism, the platen 104 is in its highest position, and the gates 31 must be swung upwardly and secured in vertical position as shown in Fig. 11. As the cotton passes through the chute between the rolls 47 and 42, it will be fed in a sheet or thin layer upon the platen, and will be mashed down on the platen by means of the rollers 42, as the carriage 41 is moved backwardly and forwardly by means of the link 55 and crank shaft 53. However, before any cotton is permitted to enter the box, the car 83 is moved so as to position a strip of burlap 116 across the upper end of the box, the hooks 103 being utilized to temporarily catch one end of the burlap, while the car moves over the box, and after the burlap is cut, this end is disconnected from the hooks, so that the burlap may feed downwardly in the box as the bale is formed, as shown in Fig. 13. The downward movement of platen 104 is resisted by the plunger 11, and it is to be understood that block 106 is located between the platen 104 and the plunger 11. To control this resistance, suitable valve mechanism connected with the engine 27 must be operated, so that the steam pressure is sufficient to require considerable pressure of the cotton to move the platen downwardly. When the platen is moved as far downwardly as it will go as shown in Fig. 13, the block 106 will be drawn outwardly from between platen 104 and the plunger. Car 83 will then be operated to lay a strip of burlap over the upper end of the box, and to do this car 83 pushes the right hand carriage outwardly as shown in Fig. 3, and at the same time, the operator disconnects the link 55 so that this carriage remains at a standstill.

Figure 14:
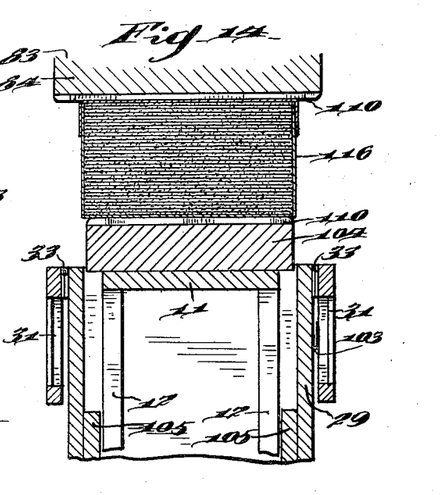
Fig. 14, is a similar view showing the bale after it is compressed.

When car 83 is over the box, the bottom of this car operates as a pressure head. Full pressure is then brought to bear upon the plunger by means of its engine to move the plunger upwardly until it engages the platen 104, and a continued upward movement compresses the bale as shown in Fig. 14 to a thickness approximating the thickness of the block 106. When the bale is fully compressed, the side gates 31 are dropped, and the bale tied in any suitable manner. I preferably tie my bale with wire, but this invention is not limited to any particular way of tying the bale. When the bale is tied, the plunger is lowered, and the bale removed, when the parts will again be in the position shown at the right of Fig. 3.

This structure is adapted to be operated continuously, one mechanism being sufficiently ahead of the other to allow one to be attended to in its compressing operation, while the other is forming a bale, and an apparatus of this kind will care for the out-put of a large battery of gins. This structure is adapted to occupy a large portion of the building, and to facilitate communication, a ladder 117 is shown, which connects the basement with an opening 118 in floor 2, and other suitable means may be provided to facilitate the operation of the parts. To limit the downward movement of the plunger, cross bars 119 are secured to the uprights 6, and are engaged by and support the platform 13 in its lowest position. When in this position, the plunger head registers with the bottom of guide 107, so that block 106 may be easily drawn out into the guide.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In an apparatus of the character described, the combination with a press box, of a pressure head adapted to be positioned in the top of said box, a plunger movable up through the bottom of said box, a platen in the box, and a removable block interposed between the platen and the plunger, substantially as described.

2. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, substantially as described.

3. In an apparatus of the character described, the combination with a press box, of a pressure head adapted to be positioned in the top of the box, a plunger movable up through the bottom of said box, a plate in the box, a removable block interposed between the platen and the plunger, bars projecting into the box and adapted to support the platen in its lowest position, and enable the removal of the block, substantially as described.

4. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, bars projecting into the box and adapted to support the platen in its lowest position, and enable the removal of the block, substantially as described.

5. In an apparatus of the character described, the combination with a press box, of a pressure head adapted to be positioned in the top of said box, a plunger movable up through the bottom of said box, a platen in the box, a removable block interposed between the platen and the plunger, said box having an opening therein, a guide registering with said opening and into which said block is adapted to be moved when drawn out of the box, substantially as described.

6. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, said box having an opening therein, a guide registering with said opening and into which said block is adapted to be moved when drawn out of the box, substantially as described.

7. In an apparatus of the character described, the combination with a press box, of a pressure head adapted to be positioned in the top of the box, a plunger movable up through the bottom of said box, a plate in the box, a removable block interposed between the platen and the plunger, bars projecting into the box and adapted to support the platen in its lowest position, and enable the removal of the block, said box having an opening therein, a guide registering with said opening and into which said block is adapted to be moved when drawn out of the box, substantially as described.

8. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, bars projecting into the box and adapted to support the platen in its lowest position, and enable the removal of the block, said box having an opening therein, a guide registering with said opening and into which said block is adapted to be moved when drawn out of the box, substantially as described.

9. In an apparatus of the character described, the combination with a press box, of a pressure head adapted to be positioned in the top of said box, a plunger movable up through the bottom of said box, a platen in the box, a removable block interposed between the platen and the plunger, said block having a recessed end, and a rod extending across said recess, substantially as described.

10. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, said block having a recessed end, and a rod extending across said recess, substantially as described.

11. In an apparatus of the character described, the combination with a press box, of a pressure head adapted to be positioned in the top of the box, a plunger movable up through the bottom of said box, a platen in the box, a removable block interposed between the platen and the plunger, bars projecting into the box and adapted to support the platen in its lowest position, and enable the removal of the block, said block having a recessed end, and a rod extending across said recess, substantially as described.

12. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, bars projecting into the box and adapted to support the platen in its lowest position, and enable the removal of the block, said block having a recessed end, and a rod extending across said recess, substantially as described.

13. In an apparatus of the character described, the combination with a press box, of a pressure head adapted to be positioned in the top of said box, a plunger movable up through the bottom of said box, a platen in the box, a removable block interposed between the platen and the plunger, said box having an opening therein, a guide registering with said opening and into which said block is adapted to be moved when drawn out of the box, said block having a recessed end, and a rod extending across said recess, substantially as described.

14. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, said box having an opening therein, a guide registering with said opening and into which said block is adapted to be moved when drawn out of the box, said block having a recessed end, and a rod extending across said recess, substantially as described.

15. In an apparatus of the character described, the combination with a press box, of a pressure head adapted to be positioned in the top of the box, a plunger movable up through the bottom of said box, a plate in the box, a removable block interposed between the platen and the plunger, bars projecting into the box and adapted to support the platen in its lowest position, and enable the removal of the block, said box having an opening therein, a guide registering with said opening and into which said block is adapted to be moved when drawn out of the box, said block having a recessed end, and a rod extending across said recess, substantially as described.

16. In an apparatus of the character described, the combination with a press box, of a pressure head adapted to be positioned in the top of said box, a plunger movable up through the bottom of said box, a platen in the box, a removable block interposed between the platen and the plunger, said block of a size corresponding to the size of the bale when compressed, bars projecting into the box and adapted to support the platen in its lowest position, and enable the removal of the block, said box having an opening therein, a guide registering with said opening and into which said block is adapted to be moved when drawn out of the box, said block having a recessed end, and a rod extending across said recess, substantially as described.

17. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, and means for reciprocating said carriage, substantially as described.

18. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, a crank shaft, a link connecting said crank shaft with said carriage, and said link adapted to be disconnected from said carriage when the latter is moved from over the box, substantially as described.

19. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, means for reciprocating said carriage, a conduit supported on the framework and adapted to receive lint cotton, a chute pivotally supported on said conduit and projected into the hopper, and conveyers in said chute directing the cotton downwardly between the rolls, substantially as described.

20. In an apparatus of the character described, the combination with a supporting framework, of a press box secured in said framework, hinged gates contituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, a crank shaft, a link connecting said crank shaft with said carriage, and said link adapted to be disconnected from said carriage when the latter is moved from over the box, a conduit supported on the framework and adapted to receive lint cotton, a chute pivotally supported on said conduit and projected into the hopper, and conveyers in said chute directing the cotton downwardly between the rolls, substantially as described.

21. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, means for reciprocating said carriage, a car constructed to support a roll of bale covering material, axles supporting the car, gears on said car mounted on the first-mentioned racks, the bottom of said car constituting a pressure head, and means for moving said car to force the carriage from over the box and position the pressure head over the top of the box, substantially as described.

22. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, a crank shaft, a link connecting said crank shaft with said carriage, and said link adapted to be disconnected from said carriage when the latter is moved from over the box, a car constructed to support a roll of bale covering material, axles supporting the car, gears on said car mounted on the first-mentioned racks, the bottom of said car constituting a pressure head, and means for moving said car to force the carriage from over the box and position the pressure head over the top of the box, substantially as described.

23. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, means for reciprocating said carriage, a conduit supported on the framework and adapted to receive lint cotton, a chute pivotally supported on said conduit and projected into the hopper, and conveyers in said chute directing the cotton downwardly between the rolls, a car constructed to support a roll of bale covering material, axles supporting the car, gears on said car mounted on the first-mentioned racks, the bottom of said car constituting a pressure head, and means for moving said car to force the carriage from over the box and position the pressure head over the top of the box, substantially as described.

24. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, a crank shaft, a link connecting said crank shaft with said carriage, and said link adapted to be disconnected from said carriage when the latter is moved from over the box, a conduit supported on the framework and adapted to receive lint cotton, a chute pivotally supported on said conduit and projected into the hopper, and conveyers in said chute directing the cotton downwardly between the rolls, a car constructed to support a roll of bale covering material, axles supporting the car, gears on said car mounted on the first-mentioned racks, the bottom of said car constituting a pressure head, and means for moving said car to force the carriage from over the box and position the pressure head over the top of the box, substantially as described.

25. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, means for reciprocating said carriage, a car constructed to support a roll of bale covering material, axles supporting the car, gears on said car mounted on the first-mentioned racks, the bottom of said car constituting a pressure head, a star wheel on one of said axles, a lever fulcrumed on the axle, a downwardly spring-pressed rod mounted on the lever, a spring-pressed pawl on the lower end of the rod engaging the star wheel, and a crank handle on the upper end of said rod adapted to be moved to swing the pawl so as to engage the star wheel from either side, and control the direction of motion of the car as the lever is reciprocated, substantially as described.

26. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, a crank shaft, a link connecting said crank shaft with said carriage, and said link adapted to be disconnected from said carriage when the latter is moved from over the box, a car constructed to support a roll of bale covering material, axles supporting the car, gears on said car mounted on the first-mentioned racks, the bottom of said car constituting a pressure head, a star wheel on one of said axles, a lever fulcrumed on the axle, a downwardly spring-pressed rod mounted on the lever, a spring-pressed pawl on the lower end of the rod engaging the star wheel, and a crank handle on the upper end of said rod adapted to be moved to swing the pawl so as to engage the star wheel from either side, and control the direction of motion of the car as the lever is reciprocated, substantially as described.

27. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, means for reciprocating said carriage, a conduit supported on the framework and adapted to receive lint cotton, a chute pivotally supported on said conduit and projected into the hopper, and conveyers in said chute directing the cotton downwardly between the rolls, a car constructed to support a roll of bale covering material, axles supporting the car, gears on said car mounted on the first-mentioned racks, the bottom of said car constituting a pressure head, a star wheel on one of said axles, a lever fulcrumed on the axle, a downwardly spring-pressed rod mounted on the lever, a spring-pressed pawl on the lower end of the rod engaging the star wheel, and a crank handle on the upper end of said rod adapted to be moved to swing the pawl so as to engage the star wheel from either side, and control the direction of motion of the car as the lever is reciprocated, substantially as described.

28. In an apparatus of the character described, the combination with a supporting framework, of a press box secured in said framework, hinged gates constituting the upper portion of said box, a platen in said box, a vertically movable plunger adapted to raise and lower said platen, horizontal racks secured to the framework, a carriage, horizontal rollers supported in said carriage, gears on said rollers mounted to move on the racks, a hopper on the carriage above certain of said rolls, other rolls in said hopper, gears on the last-mentioned rolls, racks on the frame meshing with the last-mentioned gears, ratchet mechanism connecting the gears of the rolls beneath the hopper and of the rolls in the hopper, with the respective racks, whereby when said carriage is reciprocated, said rolls will move in a direction to feed the cotton downwardly into the box, a crank shaft, a link connecting said crank shaft with said carriage, and said link adapted to be disconnected from said carriage when the latter is moved from over the box, a conduit supported on the framework and adapted to receive lint cotton, a chute pivotally supported on said conduit and projected into the hopper, and conveyers in said chute directing the cotton downwardly between the rolls, a car constructed to support a roll of bale covering material, axles supporting the car, gears on said car mounted on the first-mentioned racks, the bottom of said car constituting a pressure head, a star wheel on one of said axles, a lever fulcrumed on the axle, a downwardly spring-pressed rod mounted on the lever, a spring-pressed pawl on the lower end of the rod engaging the star wheel, and a crank handle on the upper end of said rod adapted to be moved to swing the pawl so as to engage the star wheel from either side, and control the direction of motion of the car as the lever is reciprocated, substantially as described.

29. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, and means exerting upward pressure on the plungers, substantially as described.

30. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, toggle levers connected with said plungers, crank wheels, links connecting the toggle levers and the crank wheels, steam engines, cross heads operated by said steam engines, and links connecting said cross heads with said crank wheels, substantially as described.

31. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, and a hinged door in said conduit regulating the feed into the boxes, substantially as described.

32. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, chutes pivoted to the conduit and projecting over the carriages, and directing cotton from the conduit to the carriages, substantially as described.

33. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, a car movable between the carriages and adapted to push them from over the boxes, the bottom of said car constituting a pressure head, substantially as described.

34. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, chutes pivoted to the conduit and projecting over the carriages, and directing cotton from the conduit to the carriages, a car movable between the carriages and adapted to push them from over the boxes, the bottom of said car constituting a pressure head, substantially as described.

35. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, hinged gates connected to the conduit and projecting downwardly into the chutes, apron conveyers in said chutes, and means for reciprocating said carriages and transmitting motion to said conveyers, substantially as described.

36. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, chutes pivoted to the conduit and projecting over the carriages, and directing cotton from the conduit to the carriages, hinged gates connected to the conduit and projecting downwardly into the chutes, apron conveyers in said chutes, and means for reciprocating said carriages and transmitting motion to said conveyers, substantially as described.

37. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, a car movable between the carriages and adapted to push them from over the boxes, the bottom of said car constituting a pressure head, hinged gates connected to the conduit and projecting downwardly into the chutes, apron conveyers in said chutes, and means for reciprocating said carriages and transmitting motion to said conveyers, substantially as described.

38. In an apparatus of the character described, the combination with a structural framework, of two press boxes supported in the framework, platens in said boxes, independently operated plungers movable through the bottom of said boxes, removable blocks adapted to be interposed between the plungers and the platens during the formation of the bales, and removed during the compressing action, reciprocating carriages above the boxes, rollers on said carriages adapted to feed and press the cotton in layers upon the platens when the plungers are in their highest position, and form the bales against the resistance of the plungers as the latter are forced downwardly, means exerting upward pressure on the plungers, a cotton feeding conduit supported on the framework and having openings above the boxes, a hinged door in said conduit regulating the feed into the boxes, chutes pivoted to the conduit and projecting over the carriages, and directing cotton from the conduit to the carriages, a car movable between the carriages and adapted to push them from over the boxes, the bottom of said car constituting a pressure head, hinged gates connected to the conduit and projecting downwardly into the chutes, apron conveyers in said chutes, and means for reciprocating said carriages and transmitting motion to said conveyers, substantially as described.

In testimony whereof I have signed my name to this specification in the presence of two subscribing witnesses.

TAYLOR J. SMITH.

Witnesses:
E. J. HAGNER,
W. M. ROGERS.

---

Copies of this patent may be obtained for five cents each, by addressing the "Commissioner of Patents, Washington, D. C."